United States Patent [19]
Tripp

[11] Patent Number: 5,316,815
[45] Date of Patent: May 31, 1994

[54] TUBULAR RUBBER STRUCTURE MADE FROM USED TIRES

[76] Inventor: Benjamin A. Tripp, R.R. #2, Orangeville, Ontario, Canada, L9W 2Y9

[21] Appl. No.: 55,303

[22] Filed: May 3, 1993

[51] Int. Cl.$^5$ .............................................. B32B 3/10
[52] U.S. Cl. ................................... 428/65; 428/903.3; 404/6; 405/16; 52/DIG. 9
[58] Field of Search .............................. 428/903.3, 65; 52/DIG. 9; 404/6; 405/16

Primary Examiner—Alexander S. Thomas
Attorney, Agent, or Firm—Ridout & Maybee

[57] ABSTRACT

A tubular rubber structure is made from a plurality of tire sidewalls joined together in a stacked array over which a tire, being split or having a sidewall removed, is fitted and secured to it. A further structure is made from two tires and up to about 20 sidewalls. The structures have a variety of uses as energy attenuators, erosion stabilizers and as a means for tire disposal.

8 Claims, 2 Drawing Sheets

TUBULAR RUBBER STRUCTURE MADE FROM USED TIRES

The invention is a tubular rubber structure made from used vehicle tires. The structures have many potential uses as, for example, erosion stabilizers, bumpers, foundation supports or simply as a means of tire disposal.

There is a well recognized need to find economic means for disposal or reuse of used vehicle tires. "Vehicle tires" as used herein refers to automobile as well as truck tires. Vehicle tires continue to present a major challenge to waste managers as land fill space becomes more costly. The structural robustness of vehicle tires makes their disposal a major problem, and this same characteristic makes the use of used tires as a starting material for other manufactured products generally uneconomic since extensive processing of the tires is usually needed.

The present invention provides a means for reusing old vehicle tires to produce useful tubular structures in an economic way. The invention makes use of the structural characteristics of used tires so that the structures of the invention may be produced with minimal processing of the tires.

Used vehicle tires have desirable characteristics for outdoor uses since they do not rot and they retain their general structural integrity for many years. Simply using discarded vehicle tires without alteration, however, is not satisfactory since their structural characteristics for use as tires makes them inappropriate for use in other applications without some structural modification. The present invention provides an economical means for modifying used tires to make structures having a variety of uses.

Accordingly, the invention provides a tubular rubber structure comprising, a plurality of vehicle tire sidewalls joined together in a stacked tubular array. A split vehicle tire or a tire having one of its sidewalls removed is fitted over and attached to the tubular array to form the structure of the invention. A further embodiment of the invention is a structure which is approximately two tire widths in height. Thus, a stacked tubular array of sidewalls joined together to a height of about two tire widths is fitted with two tires each having a sidewall removed, and each tire is joined to the array. The basic structures of the invention can be combined to provide larger structures for specific purposes.

BRIEF DESCRIPTION OF THE DRAWINGS

Referring to FIG. 1, a vehicle tire comprises sidewalls 3 and a tire body or belt 5. Sidewalls 3 may readily be cut from the belt 5 to give an annular member having a curved transverse shape with an inner surface 7 being transversely concave and an outer surface 8 being transversely convex. The curvature of the sidewalls 3 can be used to produce structures of the invention having varying characteristics.

Figure 4:
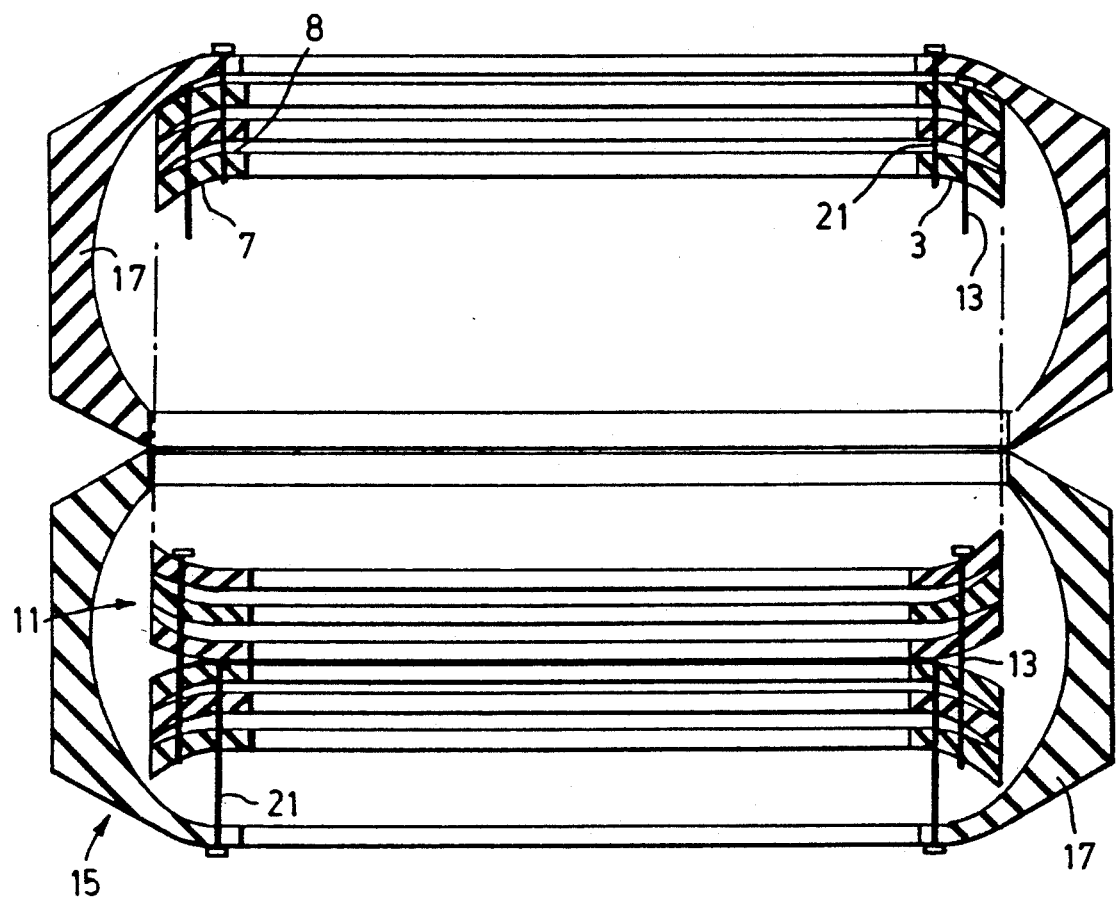
FIG. 4 is a cross sectional view of a further embodiment of the invention.

A plurality of sidewalls 3 are joined together to form a stacked tubular array 11. Preferably, the sidewalls 3 forming the array 11 are of similar sizes, and most preferably, the sidewalls 3 are all of the same size for this purpose. The tubular array 11 is assembled preferably using mechanical means such as screws 13. A two tire width structure 15 as shown in FIG. 4 requires up to about 20 sidewalls 3. Fewer sidewalls 3 are required if some are positioned in an anti-nesting fashion to provide a structure 15 having less than maximum density or stiffness. Preferably, screws 13 for assembling the stacked array are driven through the sidewalls 3 near their outer edges, and conveniently, screws 13 may be used to join sidewalls 3 at intermediate stages of assembly of the array 11.

Figure 1:
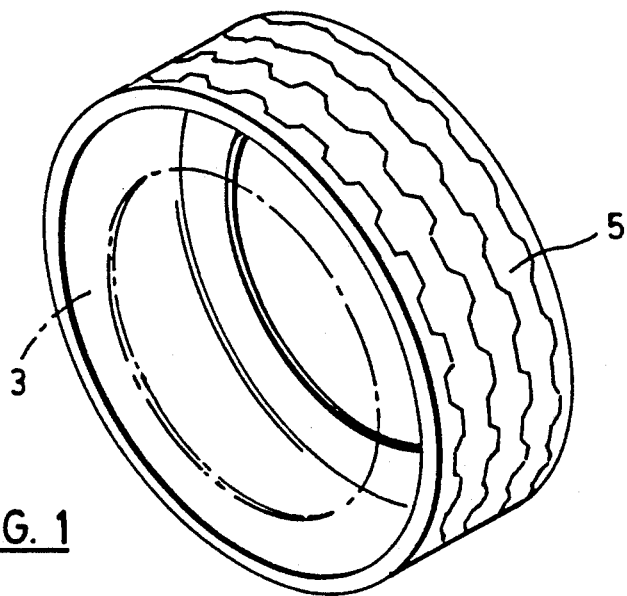
FIG. 1 is a perspective view of a vehicle tire and removed sidewall.
Figure 2:
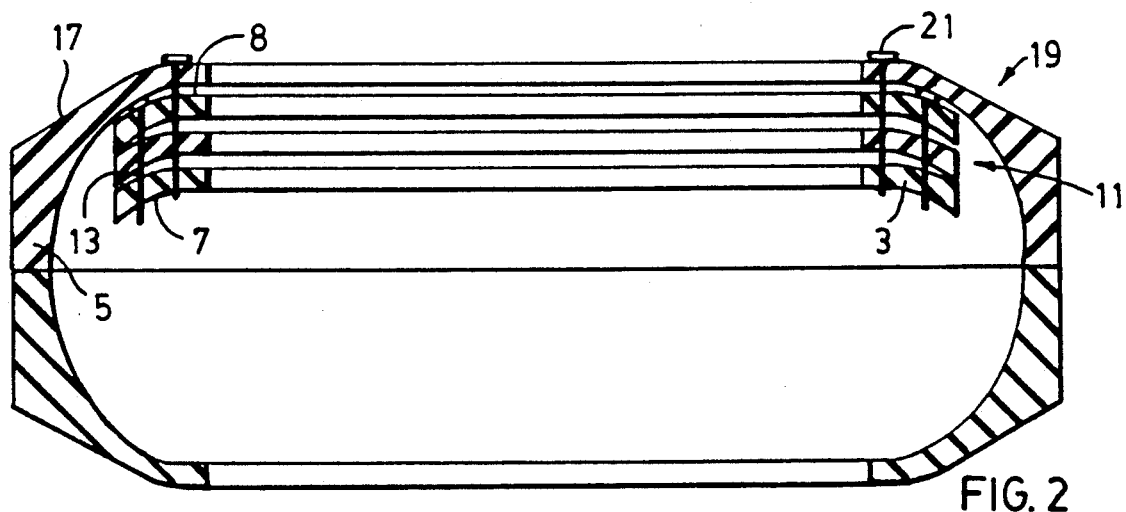
FIG. 2 is a cross sectional view of a basic structure of the invention made from a split tire and sidewalls.
Figure 3:
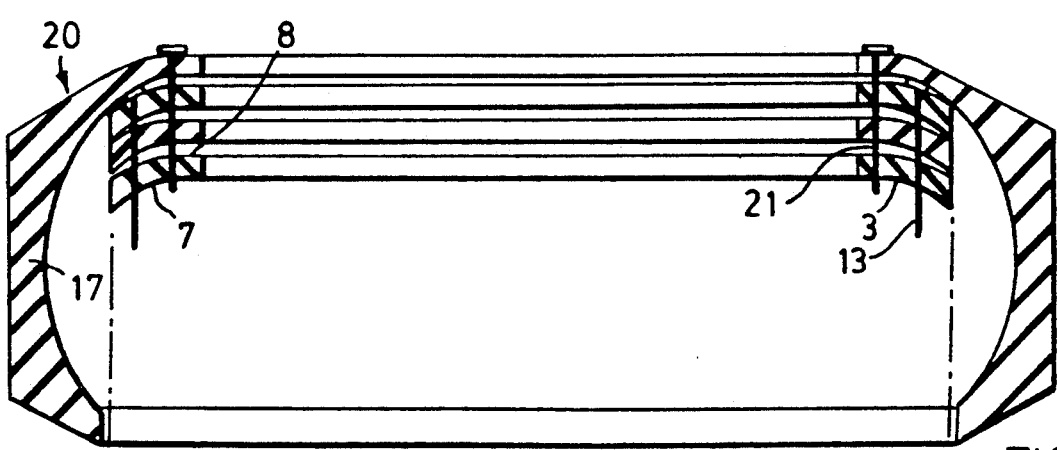
FIG. 3 is a cross sectional view of an alternate structure of the invention.

The stacked tubular array 11 is encased in at least one vehicle tire 17 which is split circumferentially, centrally through its belt 5, or a tire 18 which has one of its sidewalls removed to provide basic structures 19 and 20 (FIGS. 2 and 3). As shown in FIG. 4, the structure 15 uses two modified tires 18 to encase an array 11. The modified tires 17 or 18 are joined to the array 11, preferably using mechanical means such as screws 21. Preferably, the screws 21 are driven through the sidewalls 3 near the bead or their inner circumferential edges.

As the skilled person will appreciate, various methods can be used to assemble the structures of the invention, and indeed the basic structures 19 and 20 may be modified within the invention's scope. Thus, the invention includes a stacked array 11 of sidewalls 3 of any nesting combination. Various thicknesses of structures can be produced by combining the basic one or two tire thickness structures 19, 20 and 15 described. The structure 19 of FIG. 2 can accommodate up to about 8 sidewalls 3, and the structure 20 of FIG. 3 can include up to about 10 sidewalls 3. This latter structure 20 is particularly suitable for assembly using a truck tire and truck sidewalls 3.

The structures 15, 19 and 20 may be maneuvered manually by rolling, or by machine. Structures 15 and 19 made from automobile or light truck tires are desirable for many applications. Truck tires are significantly heavier and stiffer than automobile tires, and such structural characteristics are desirable for structures 20 used as energy attenuators along highways, breakwaters, dock cribs and the like.

By way of example, the structures of the invention may be used for erosion control. River banks or shore areas may be stabilized using a plurality of structures 19. Road shoulders adjacent culverts or underpasses may likewise be stabilized. The structures may be sunk to stabilize the beds of waterways or canals.

Structures of the invention can be positioned side by side and filled with sand or gravel to stabilize cofferdams or dikes.

Breakwaters, causeways or spits can be constructed using the structures of the invention.

Structures 15 have a natural insulating property which makes them suitable for use in constructing foundations in permafrost.

A primary perceived use of the structures of the invention is for energy absorption. Thus, structures 20 can serve as dock bumpers, highway impact absorbers, traffic barriers and the like. The structures may be oriented vertically or horizontally for this purpose.

The structures 15 may be used for underwater foundations or as supports for structures on dry land.

Passive uses for the structures of the invention, e.g. the structure 15, include used tire storage and tire disposal. The density of the structures is such that they will not float nor will they resurface once buried.

As mentioned, the density of the structures, and hence, the force-displacement function, may be varied by the way the sidewalls 3 are oriented in the stacked array 11. By placing all sidewalls 3 in a nesting configuration, i.e. with each inner surface 7 resting atop an outer surface 8 of the adjacent sidewall 3, maximum density and stiffness is achieved. By alternating the orientation of the sidewalls 3 in the array 11 to provide a fully anti-nesting configuration, minimum density and stiffness for the structure is obtained. Various intermediate degrees of density and stiffness may be obtained by providing a stacked array 11 having various degrees of sidewall 3 nesting.

I claim:

1. A tubular rubber structure, comprising:
   a plurality of vehicle tire sidewalls joined together in a stacked tubular array approximately one tire width in height; and
   a vehicle tire having one sidewall removed or a vehicle tire being centrally, circumferentially split, which tire fits over the tubular array of sidewalls and is joined to it.

2. A structure as claimed in claim 1, wherein the sidewalls are joined together mechanically and the vehicle tire is mechanically joined to the tubular array of sidewalls.

3. A structure as claimed in claim 2, wherein the sidewalls are joined together by screws and the tire is joined to the tubular array by screws.

4. A structure as claimed in claim 1, wherein the sidewalls are stacked in a nesting, partial anti-nesting or fully anti-nesting configuration.

5. A tubular rubber structure, comprising:
   a plurality of vehicle tire sidewalls joined together in a stacked tubular array approximately two tire widths in height; and
   two vehicle tires each having a sidewall removed, one of which tires fits over each end of the tubular array of sidewalls and is joined to it.

6. A structure as claimed in claim 5, wherein mechanical means are used to join the sidewalls to one another and to join the tires to the tubular array.

7. A structure as claimed in claim 6, wherein the mechanical means are screws.

8. A structure as claimed in claim 5, wherein the sidewalls are stacked in a nesting, partial anti-nesting or fully anti-nesting configuration.

* * * * *